(12) United States Patent
Kourtoglou

(10) Patent No.: US 6,324,819 B1
(45) Date of Patent: Dec. 4, 2001

(54) PACKAGING APPARATUS

(75) Inventor: Dimitrios Kourtoglou, Nea Smimi (GR)

(73) Assignee: Kourtoglou S.A. Food Packaging Machinery, Nea Smimi (GR)

( * ) Notice: Subject to any disclaimer, the term of this patent is extended or adjusted under 35 U.S.C. 154(b) by 0 days.

(21) Appl. No.: 09/376,959

(22) Filed: Aug. 19, 1999

Related U.S. Application Data

(63) Continuation of application No. PCT/EP98/00960, filed on Feb. 19, 1998.

(30) Foreign Application Priority Data

Feb. 20, 1997 (DE) .............................. 197 06 797

(51) Int. Cl.[7] .............................. B65B 47/00; B29C 49/00
(52) U.S. Cl. .............................. 53/559; 53/561; 425/526; 425/529; 425/541
(58) Field of Search .............................. 425/526, 527, 425/529, 534, 537, 535, 541, 354, 161, 176, 236; 53/559, 561

(56) References Cited

U.S. PATENT DOCUMENTS

| | | | |
|---|---|---|---|
| 2,940,120 | * 6/1960 | Grebowiec | 425/541 |
| 3,808,772 | * 5/1974 | Turtschan | 53/559 |
| 3,837,782 | 9/1974 | Meissner et al. | |
| 4,543,770 | * 10/1985 | Walter et al. | 53/559 |
| 4,565,052 | * 1/1986 | Hautemont | 53/559 |
| 4,732,557 | * 3/1988 | Aoki | 425/529 |
| 4,859,170 | * 8/1989 | Aoki | 425/541 |
| 5,178,817 | * 1/1993 | Yamada et al. | 425/529 |
| 5,306,325 | * 4/1994 | Smith et al. | 425/541 |
| 5,941,054 | * 8/1999 | Valyi | 53/559 |
| 5,975,880 | * 11/1999 | Takada et al. | 425/526 |
| 6,045,746 | * 4/2000 | Komine et al. | 425/529 |

FOREIGN PATENT DOCUMENTS

| | | |
|---|---|---|
| 2.261.812 | 6/1973 | (DE) . |
| 106.425 | 4/1984 | (EP) . |
| 564 382 | 6/1993 | (EP) . |
| 1.262.380 | 4/1961 | (FR) . |
| 1.427.784 | 1/1966 | (FR) . |
| 1.554.475 | 9/1968 | (FR) . |
| 2.477.948 | 9/1981 | (FR) . |
| WO85/03488 | 8/1985 | (WO) . |

* cited by examiner

Primary Examiner—Peter Vo
Assistant Examiner—Louis K. Huynh
(74) Attorney, Agent, or Firm—Laubscher & Laubscher

(57) ABSTRACT

The present invention relates to a method of producing packaging containers of plastics, a packaging container, in particular produced according to said method, a method of producing filled and closed packaging containers, a molding station for a plastic packaging container and a packaging machine having such a molding station.

According to the invention a packaging container is produced in a continuous method and an associated packaging machine in a combined deep-drawing/blow-molding operation with undercuts and is subsequently filled in a continuous process with a packaging material and sealed, wherein the closed packaging containers are subsequently separated from one another and discharged, optionally provided with a reclosable cover.

11 Claims, 17 Drawing Sheets

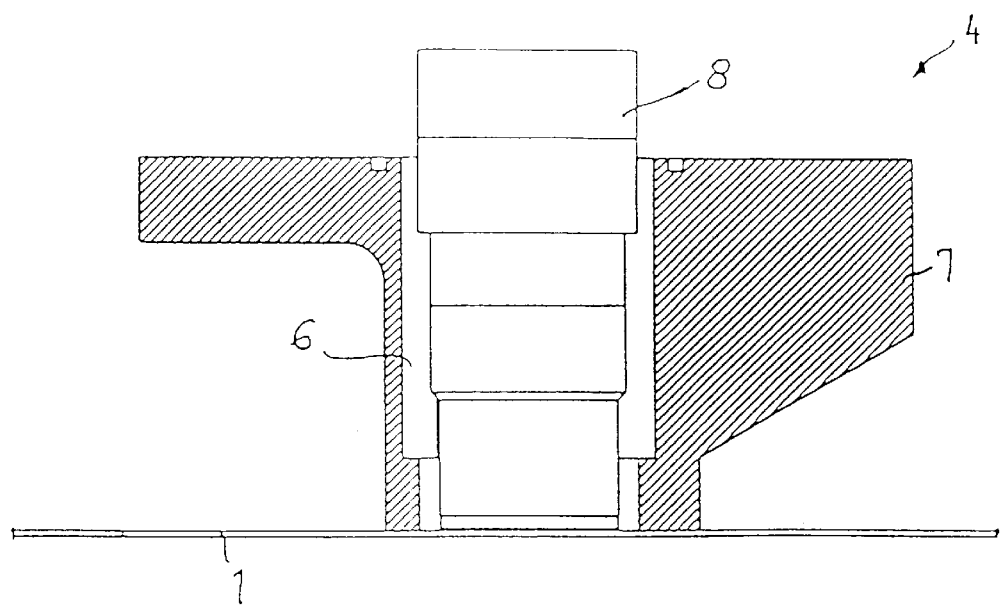
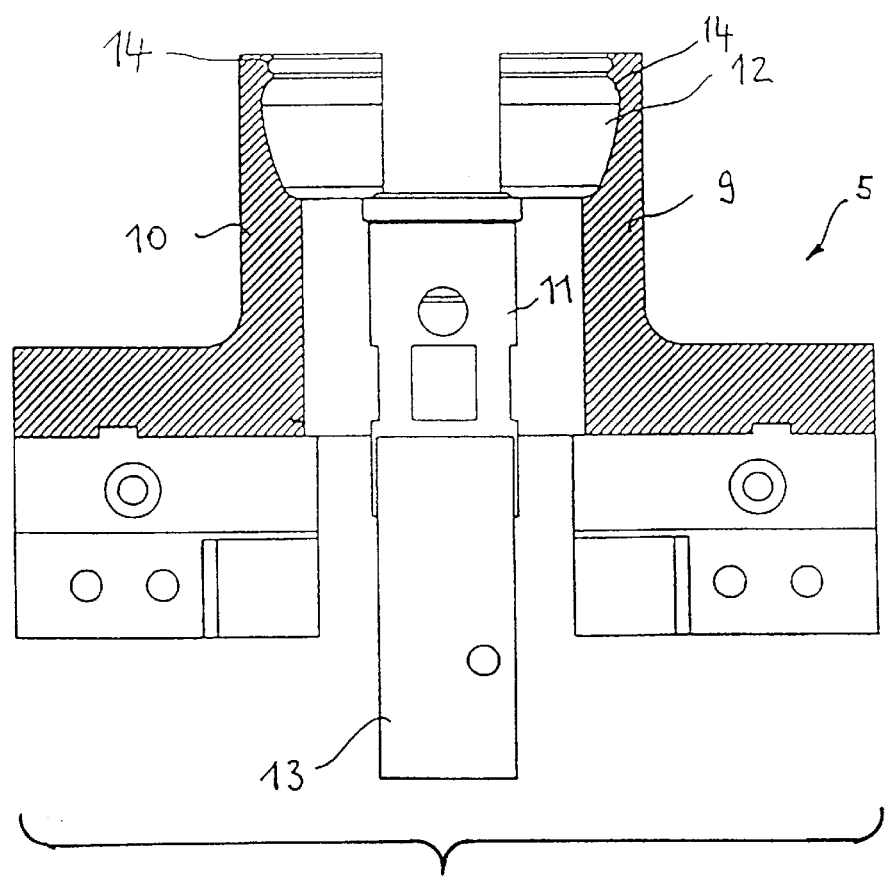
Fig. 2a

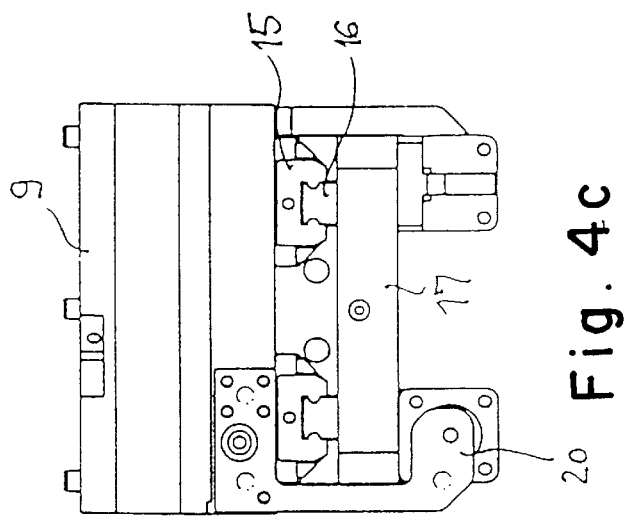
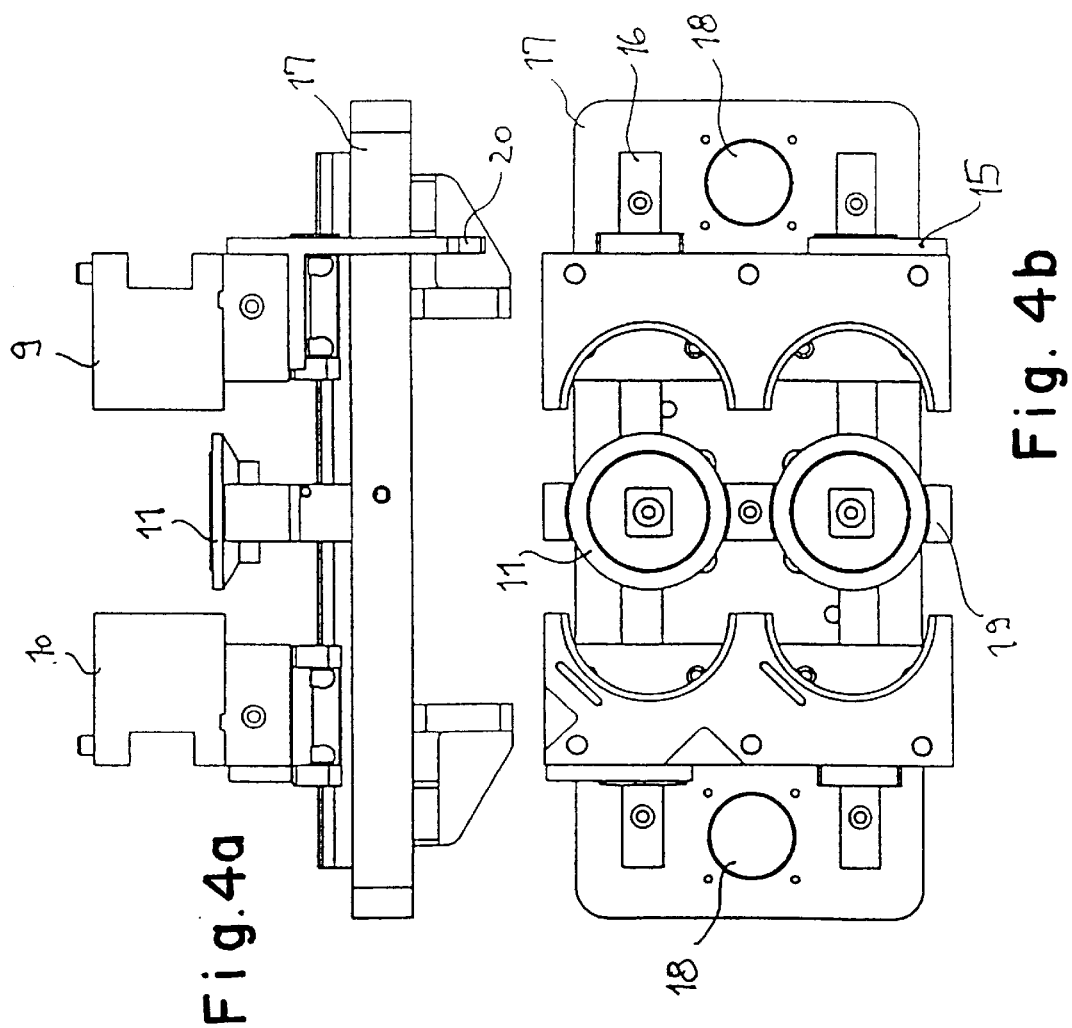

PACKAGING APPARATUS

REFERENCE TO RELATED APPLICATION

This is a continuation of International Application No. PCT/EP98/00960 filed Feb. 19, 1998.

STATEMENT REGARDING FEDERALLY SPONSORED RESEARCH OR DEVELOPMENT

Not applicable

REFERENCE TO MICROFICHE APPENDIX

Not applicable

BACKGROUND OF THE INVENTION

1. Field of the Invention

The present invention relates to a method of producing packaging containers of plastics, to a packaging container, in particular produced according to said method, a molding station for a plastic packaging container and a packaging machine comprising such a molding station and to a method of producing filled and closed containers.

2. Description of Related Prior Art

So far the production of packaging containers of plastics, in particular for packing foodstuff, has had various disadvantages which have had the effect that efficiently produced plastic packaging containers only exist in a very limited number of shapes and are normally devoid of any reclosing possibilities.

In particular, it has so far only been possible to produce straight-walled, cylindrical or conical cups or containers without any undercuts by deep-drawing, blow-molding or similar processes.

Such containers, however, turn out to be troublesome as to their stability and standing capacity. Moreover, liquid substances, for instance paste-like foodstuff, cannot be filled into such containers at a high speed because the reaction forces always-tend to splash back the packing material during the filling process. Therefore, liquid substances cannot be filled into straight-walled or conical containers at such a high speed as is desired and, in particular, is also possible with containers having undercuts, in which the filling opening has a smaller cross-section than the remaining container cross-section, whereby back splashing or ejection is avoided.

For manufacturing reasons packaging containers which have been made from a plastic film could thus not be provided with shapes that have turned out to be advantageous in the glass or ceramic sector or in the case of injection-molded containers. Moreover, with packaging containers made from a plastic film, it is often not possible to permanently reclose the corresponding filling openings because they are often only closed by a disposable sealing film which after having been torn off cannot be permanently closed again.

SUMMARY OF THE INVENTION

It is therefore the object of the present invention to provide a method of producing packaging containers of plastics, a molding station for such a plastic packaging container, a packaging machine, a plastic packaging container and a method of producing filled and closed packaging containers which exhibit a much greater variety as to the producibility of packaging containers, in particular packaging for foodstuff, and which make it possible to combine the advantages of conventional packaging containers which are not produced on the basis of a plastic film, that is e.g. reclosability, high standing capacity and dimensional stability, together with a highly efficient production.

In a method of the aforementioned type this object is achieved according to the invention in that the film is first displaced by at least one plug of the upper mold in a deep-drawing process into a mold cavity of the lower mold and a final molding operation is subsequently performed by a blow-molding process with supply of a gaseous medium into the mold, with the film being placed on a wall of the mold cavity formed in the lower mold. Packaging containers having virtually any desired cross-section of a high standing capacity can thus be produced which exhibit excellent packaging characteristics even at a reduced wall thickness and can e.g. be provided with screw caps.

Preferably, the film is preheated prior to the impact of the plug of the upper mold, and the deep-drawing process is carried out at a variable speed of the plug over the plug path.

Depending on a predetermined plug position, in particular close to the end or after the end of the deep-drawing process (maximum plug path of the plug of the upper mold), the blow-molding operation is started by blowing compressed air into the annular space between the plug and the film-material molding which has been preformed in the mold cavity of the lower mold; this has the effect that the film is completely placed on the mold cavity in the lower mold, also in a preferably upper undercut area.

As for the molding station for molding a plastic packaging container, the aforementioned object is achieved according to the invention in that the molding station comprises at least one upper mold and at least one lower mold, with an axially displaceable plug being provided in the tipper mold and a mold cavity in the lower mold, the plug being displaceable under (Jeep-drawing of a plastic film into the mold cavity and the lower mold being laterally divided such that the lower mold halves are movable substantially in a direction perpendicular to a motional direction of the plug for opening and closing the lower mold, and a compressed-gas supply means being provided for finally shaping the packaging container in the mold cavity through a blow molding process, in particular by the action of compressed air.

The bottom portion of the mold cavity in the lower mold is preferably formed by a counter-plug which is optionally also movable in a vertical direction.

Preferably, the mold members of the lower mold that form the mold cavity are at least partly subjected to a local temperature control by an at least partial cooling or heating operation.

The aforementioned object is achieved according to the invention with respect to the packaging machine in that said machine comprises a molding station for plastic packaging containers, in which station a packaging container having at least one undercut can be produced from a plastic film in a combined deep-drawing/blow-molding process, a filling station for filling the packaging container with a packing material, a sealing station for sealing a filling opening of the packaging container, a separating station for individualizing the packaging containers and a discharge station for the filled and sealed packaging containers.

It is advantageously possible through the solution according to the invention to produce e.g. packed foodstuff in a compact packaging machine unit, wherein at the input side the plastic film is continuously supplied as a semifinished product for forming the packaging container in the molding station while at the output side the packing material which has individually been packed into the individual packaging containers leaves the packaging machine.

As for the plastic packaging container itself, the aforementioned object is achieved according to the invention in that the packaging container which has been produced from a plastic film has at least one undercut and is closable with a sealing film provided with an opening device and/or is provided with closing means for holding a cover.

Preferably, the packaging container comprises a radially projecting circumferential edge portion for holding an associated cover of a plastic film.

It is advantageous for a permanent reclosing of the once-opened packaging container that said container comprises a screw thread as a closing means in a neck or bottom portion of the packaging container for screwing a cover, which also consists, in particular, of a plastic material.

The present invention shall now be described in more detail with reference to embodiments and associated drawings, in which:

FIGS. 2a to 2e are schematic cross-sectional views showing the operation of upper mold and lower mold in a molding station of a packaging machine for producing a packaging container;

FIGS. 4a to 4c are a front view, a top view and a side view of the lower mold according to FIG. 3;

FIG. 8b is a sectional view according to FIG. 8a;

Figure 1:
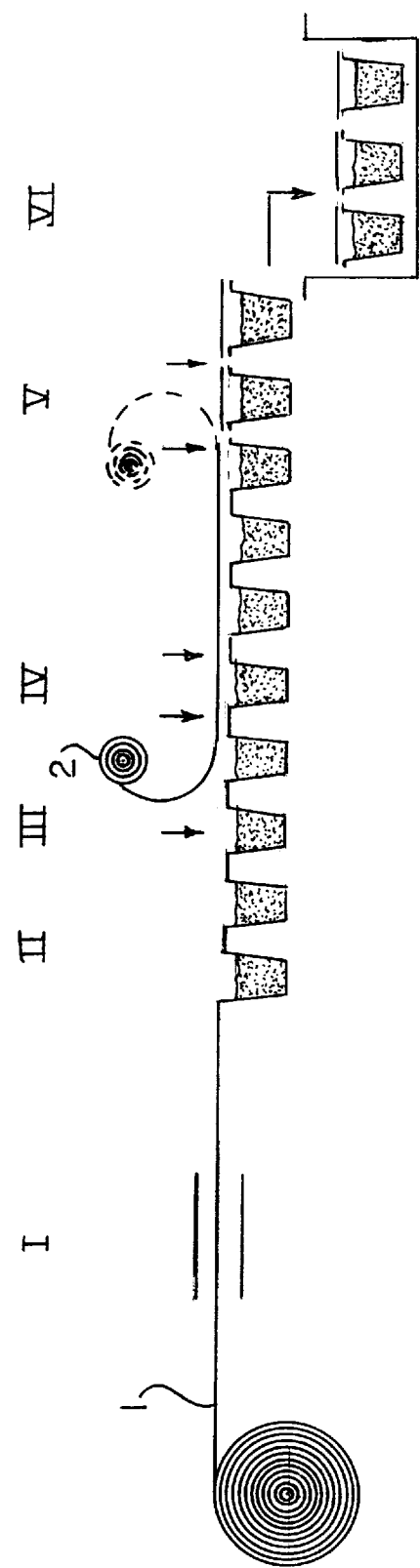
FIG. 1 is a schematic sketch showing the principle of the operation and arrangement of the stations of a packaging machine according to an embodiment of the present invention.

FIG. 1 is a sketch illustrating the principle of the working method of the packaging machine which following a film preheating station I integrally comprises a molding station 11 for molding the packaging containers, then a filling station III followed by a hot-sealing station IV, a cutting station V in which the filled and sealed packaging containers are individualized, and a discharge and packing station VI.

A sufficiently dimensionally stable and deep-drawable packaging film 1, preferably of a thermoplastic material, is supplied from the feed side of the packaging machine and is heated, for instance by infrared radiation, in the preheating station I. The packaging container is subsequently formed in the molding station II by a combined deep-drawing/blow-molding operation, as will be explained with reference to the technical mold configuration of the molding station, which will be described in more detail below.

The semifinished packaging containers which are thus formed as recesses in the continuous packaging film can easily be conveyed through the packaging machine by virtue of their continuous material cohesion, thereby passing into the filling station where the packaging containers are filled with any kind of packing material, preferably foodstuff. It is only for the sake of a simple illustration that the storage containers 3 in FIG. 1 are schematically shown as simple conical bodies without any undercuts. In reality, the moldings are containers as are, e.g., shown in FIG. 2e.

The filled packaging containers are subsequently conveyed to a hot-sealing station as a still continuous material, the filled packaging containers being closed by applying a hot-sealing film 2 (e.g. a composite film of aluminum and plastics).

As diagrammatically shown in FIG. 1, the film is preferably supplied from above from a supply roll in combination with a hot-sealing plug (which is here not shown in greater detail).

In the cutting station the form of the cover is then punched out from the hot-sealing film, with the still cohering material being simultaneously severed between neighboring packaging containers, so that both the hot-sealing film 2 and the packaging film 1 are severed.

The filled and closed packaging containers are subsequently conveyed to the discharge station and packed into pallets or containers.

If necessary, a further cover, such as a screw cap, can be placed on the sealed and filled packaging containers.

The design of the molding station 11, which will be explained in the following in more detail as to the technical mold structure, is essential for the special variability and configuration of the packaging containers.

FIG. 2a is a vertical sectional view schematically showing, also for the explanation of the method of producing a packaging container 3, an upper mold 4 and a lower mold 5 which are essential parts of the molding station 11 for forming the packaging container 3 through a combined deep-drawing/blow-molding process of the packaging film 1. In a recess of a receiving body 7 of the upper mold 4, which recess simultaneously serves as a compressed-air chamber 6, a preferably stepped plug is guided in a vertically movable manner such that the compressed-air chamber 6 is available as an annular chamber between the plug 8 and the receiving body. The receiving body 7 is stationarily arranged; the packaging film which is continuously guided through the molding station 11 is designated by 1.

Although this is here not shown in detail, the packaging film 1, in particular the thermoplastic film, which may also have a multilayered structure and may be flamed, inscribed, decorated, perforated (i.e. in one or a plurality of layers) and may be subjected to corresponding pretreatments for product identification, is heated in the preheating station I before being introduced into the molding station 11.

In this respect infrared radiation methods can be, just as advantageously employed as inductive heating or heating of the packaging film 1 by a heated gas flow. In general, the packaging film 1 should be preheated as homogeneously as possible.

Only for specific and special packaging container geometries (simple shapes) it may also be advantageous to provide a pronounced local heat profile for heating specific areas of the packaging film 1 and to permit a locally variable heating operation.

To this end control means are used for the entire heating tool located in the preheating station I or a heating plate for special shapes or for increasing the manufacturing speed. It is also possible through the assignment of corresponding sensors to specifically control partial areas or individual surfaces of the packaging film as to its preheating.

In the case of difficult production tasks, it may also be useful to combine the heating and cooling steps of the packaging film 1 for a locally variable temperature control of the packaging film 1. When a multilayer packaging film is used, a separate or different heating operation may be performed from above and below, e.g. in particular by infrared radiation.

The lower mold 5, which is shown in FIG. 2a in the opened state (also shown in the opened state is the total mold which consists of upper and lower molds 4, 5), comprises two laterally movable lower mold halves 9, 10 as well as a counter-plug 11 which at the bottom side defines a preferably rotationally symmetrical mold cavity 12, which as for the rest is defined by the two lower mold halves 9, 10. The counter-plug 11, in turn, is supported via a bearing body 13 and can also be moved vertically. In the present embodiment the mold cavity 12 comprises undercuts 14, so that packaging containers having a much greater variety of shapes and greater standing capacity can be produced by virtue of the special design of the lower mold 5.

Although this is not shown in detail in the present instance, the lower mold halves 9, 10 as well as the counter-plug 11 are preferably heated and/or cooled individually. This is also true for the plug 8 and the receiving body 7, respectively, of the upper mold. Therefore, the total mold preferably consists of a material exhibiting a high thermal conductivity, preferably an aluminum alloy.

Depending on the geometry of the mold cavity 12, other materials may also be used for the upper and lower molds as well as a special, locally controlled and purposeful temperature regulation inside the mold, particularly using local sensors the signals of which are processed in an electronic control means.

Although this is here not shown, a direct labeling operation may be performed inside the molding station by additionally supplying a label strip to the mold cavity or by inserting individual labels into the mold cavity 12 (preferably with a supply unit or an industrial robot).

To ensure a high degree of adaptation to different packaging films 1, all elements of the molding station, i.e. all members of the upper and lower molds 4, 5, in particular the upper plug 8 and the molding elements of the lower mold 5, can be exchanged easily and rapidly.

The plug material of the plug 8 and of the counter-plug 11, respectively, is of particular importance to the sequence of the molding process for the packaging films and to the travel of the material inside the mold cavity; moreover, the plug geometry is adapted to the geometry of the mold cavity aid a speed profile is chosen for the deep-drawing of the packaging film I by the upper plug 8 into the mold cavity 12. Preferably, the plug 8 (deep-drawing plunger) is controlled pneumatically. The plug speed-is exactly controlled in response to the geometry of the molded packaging body to be produced. In response to the necessary precision of the speed control of the plug movement the plug 8 (deep-drawing plunger) may also be controlled by servomotors instead of pneumatic control means. The plug speed is thus greatly dependent on the plug path, i.e. on the respective immersion depth of the plug into the mold cavity with simultaneous deep-drawing of the packaging film 1 (see also FIGS. 2c, 2d).

Figure 2B:
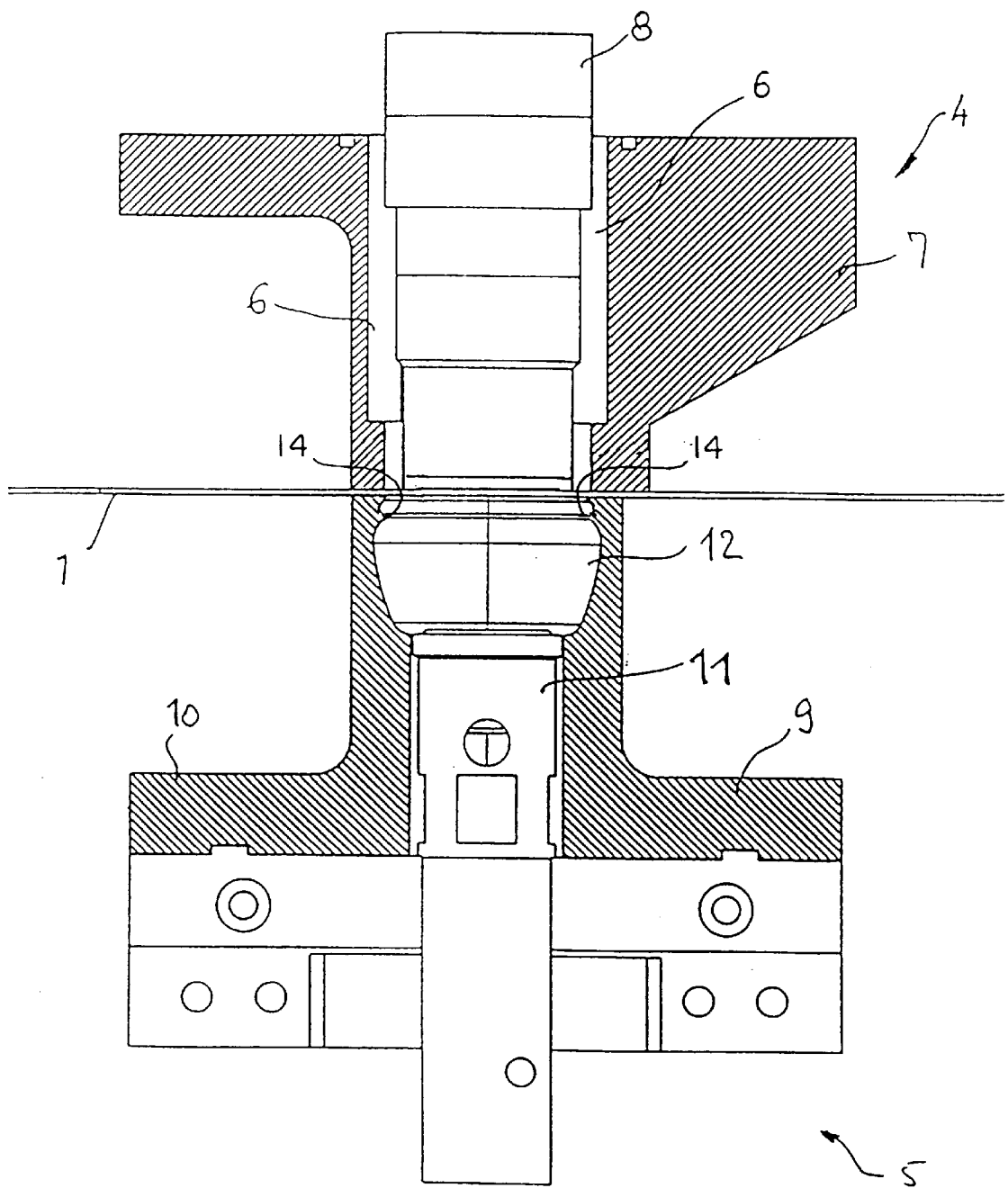

FIG. 2b shows the closed total mold consisting of upper and lower molds 4, 5, with the lower mold halves 9, 10 defining the mold cavity 12 in combination with the counter-plug 11 at the bottom side, and the receiving body 7 being operative as a hold-down means for the heated packaging film 1. In FIG. 2b the plug 8 is shown at the beginning of the deep-drawing process (seated on the packaging film 1).

Figure 2C:
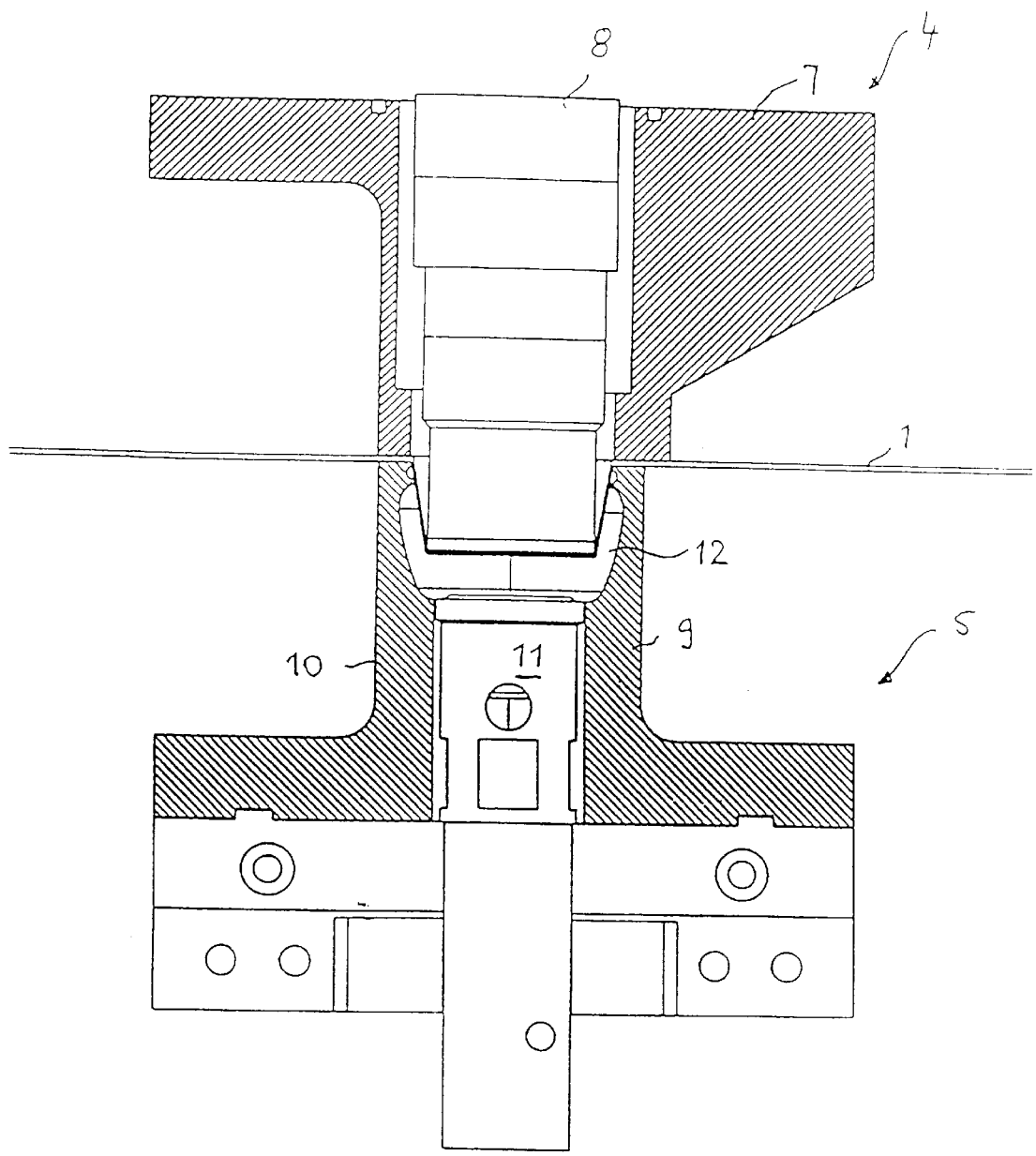

FIG. 2c illustrates a first part of the deep-drawing process for the packaging film 1 into the mold cavity 12.

Figure 2D:
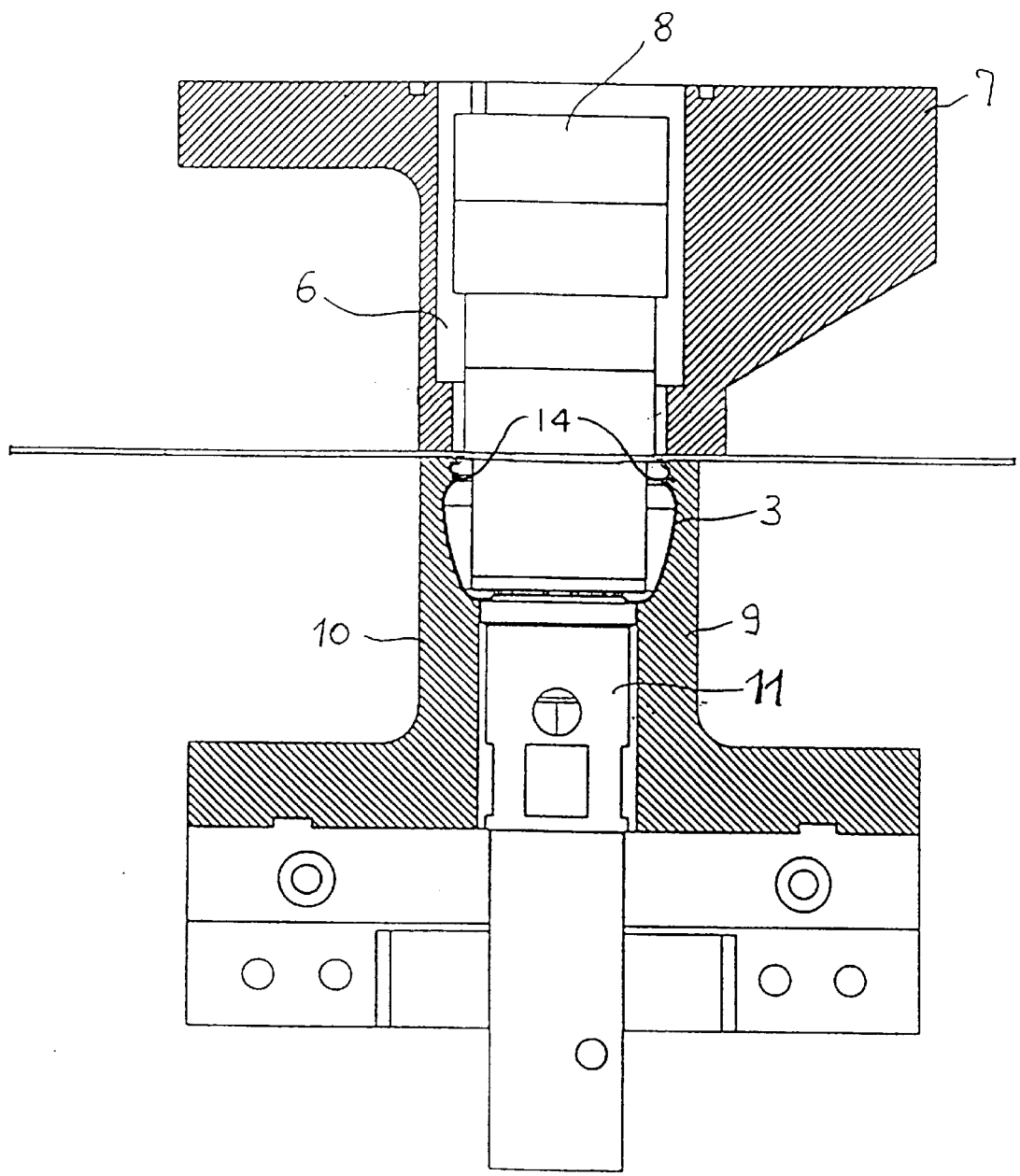

FIG. 2d shows the plug 8 in its lower end position, and the packaging container 3 is formed by superimposing the end phase of the deep-drawing process with a blow-molding process by blowing compressed air from the compressed-air chamber 6 along the plug 8 into the preformed blank of the packaging container; in particular, the lateral shape of the packaging container 3 is produced, and the packaging container 3 is given its final shape in that on account of the blown-in compressed air the packaging film moves radially away from the plug 8 and completely contacts the inner wall of the mold cavity 12.

Depending on the shape, the plug 8 may optionally be provided with radially and/or axially adjustable elements for a widening or spreading function to reach the final shape of the packaging container 3 already during the deep-drawing process as much as possible and to keep the deformation amount as low as possible, said amount being the result of the subsequent blow-molding process or a blow-molding process carried out during the final phase of the deep-drawing process at the same time as said deep-drawing process. As the heated packaging film 1 is placed on the wall of the mold cavity 12 of the lower mold 5 due to the air pressure (blow molding), the film is cooled there.

Figure 2E:
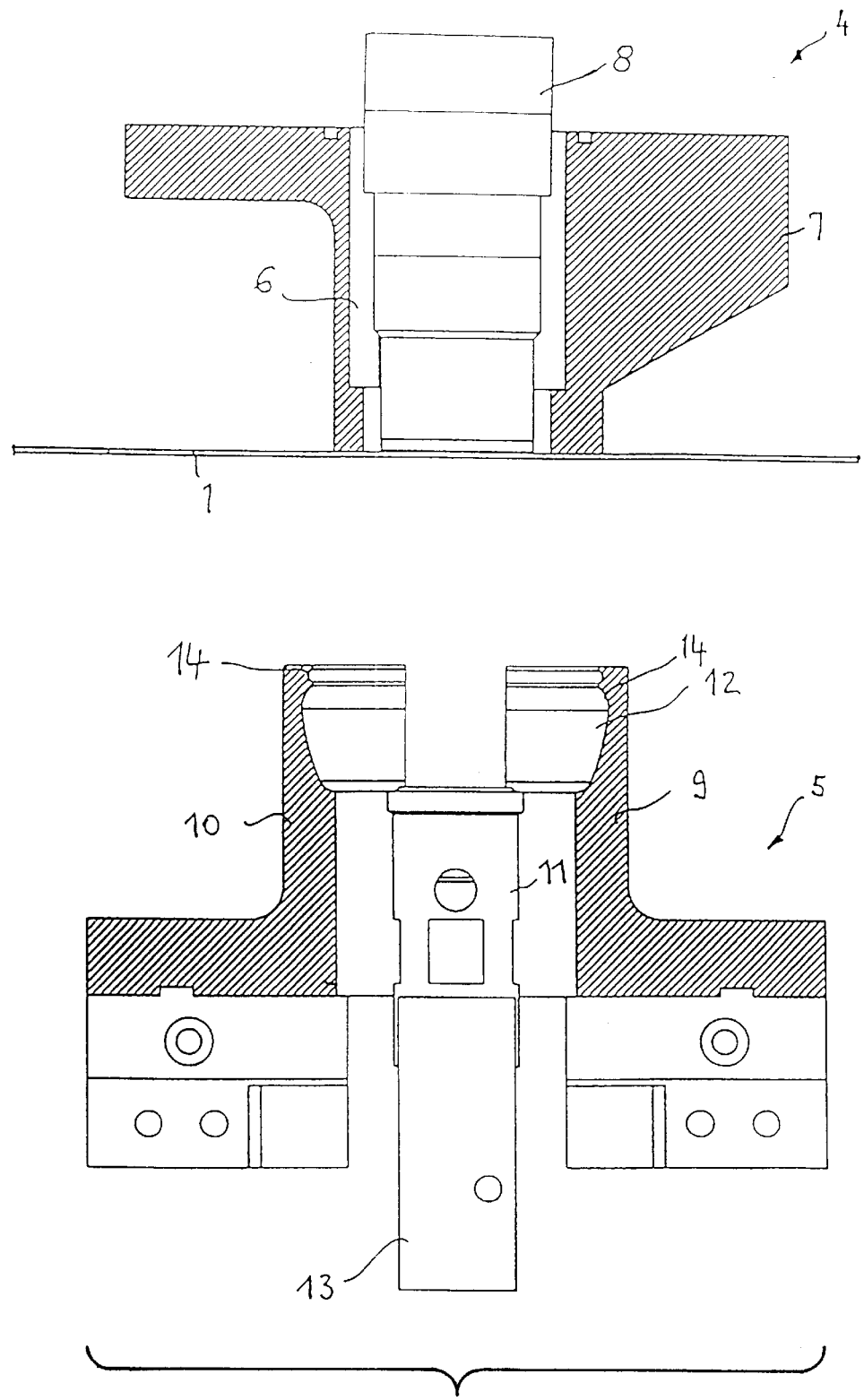

After the packaging container 3 has been given its final shape in the lower mold 5, the upper plug 8 is again withdrawn and the lower mold 5 is opened, as shown in FIG. 2e.

At the same time, the lower mold is moved back downwardly, so that the molded packaging body 3 produced adheres in an integral composite material structure to the remaining packaging film 1 and can also be transported with said film from the molding station 11 into a subsequent filling station.

Thanks to the special mold design of the lower mold and the lateral movability of the two lower mold halves 9 and 10, the packaging container 3 may also comprise undercuts 14 without the final molding process presenting any difficulties.

Although this is not shown in the FIGS., the packaging container may be provided in its neck portion and also at its bottom side with holding projections or other means, such as a round-thread embossing, for screwing a screw cap thereonto.

Plug speed, mold shape and mold temperature as well as air supply must be adapted to one another, just like the material of the tool, including the plug 8, with respect to the material of the packaging film 1.

Preferably, the plug speed of the plug 8 (and if necessary, also a vertical motional speed of the lower, counter-plug 11) is variably controlled via servomotors or a pneumatic control means.

The control of the plug temperature of the plug 8 may be locally variable, but is preferably kept constant. The same is true for the design and structurization of the surface of the plug 8 and for the control of the mold temperature of the lower mold 5 (uniform or locally variable) and the surface design, in particular, for the mold cavity 12 of the lower mold 5. The air temperature of the compressed air which is blown in for the blow molding process may also be subjected to a special control.

For an enhancement of the production speed it is possible to compose the plug 8 of a plurality of plugs that are working inside one another in telescopic fashion.

The mold cavity 12 in the lower mold may also have the geometries of handles. The molding process in this mold is as follows:

The film transport of the packaging film I in the preheated and/or pretreated state is first performed in the area between upper and lower molds 4, 5. The packaging film 1 is then stopped. The lower mold 5 is subsequently closed, and then also the total mold, namely by vertical movement of the lower mold and mounting of the hold-down means (receiving body 7). The precisely temperature-control led (heated or cooled) plug 8 is now lowered at a controlled speed, which is variably adapted to the deep-drawing process, for molding the packaging film 1 by deep-drawing into the mold cavity 12 of the lower mold 4. The packaging film 1 is only in slight contact with the lower mold 5 in the neck portion; in this area the radial gap or distance between plug 8 and mold cavity 12 essentially corresponds to the wall thickness of the later packaging container 3 (film thickness) plus a certain motional tolerance. After a certain distance has been covered by the plug 8, the additional blow molding operation is started, in particular triggered by the plug 8 (blowing compressed air via the compressed-air chamber 6 downwards into the space between plug 8 and preshaped packaging film 1), whereupon the heated packaging film 1 is placed by air pressure on the wall of the mold cavity 12 and cooled there.

The plug 8 is then returned upwards and the tool is opened (including opening of the lower mold 5); the packaging container 3 which adheres to the composite film material (see FIG. 2e) is then transported out of the area of the molding station 11 to the filling station (not shown here).

Figure 3:
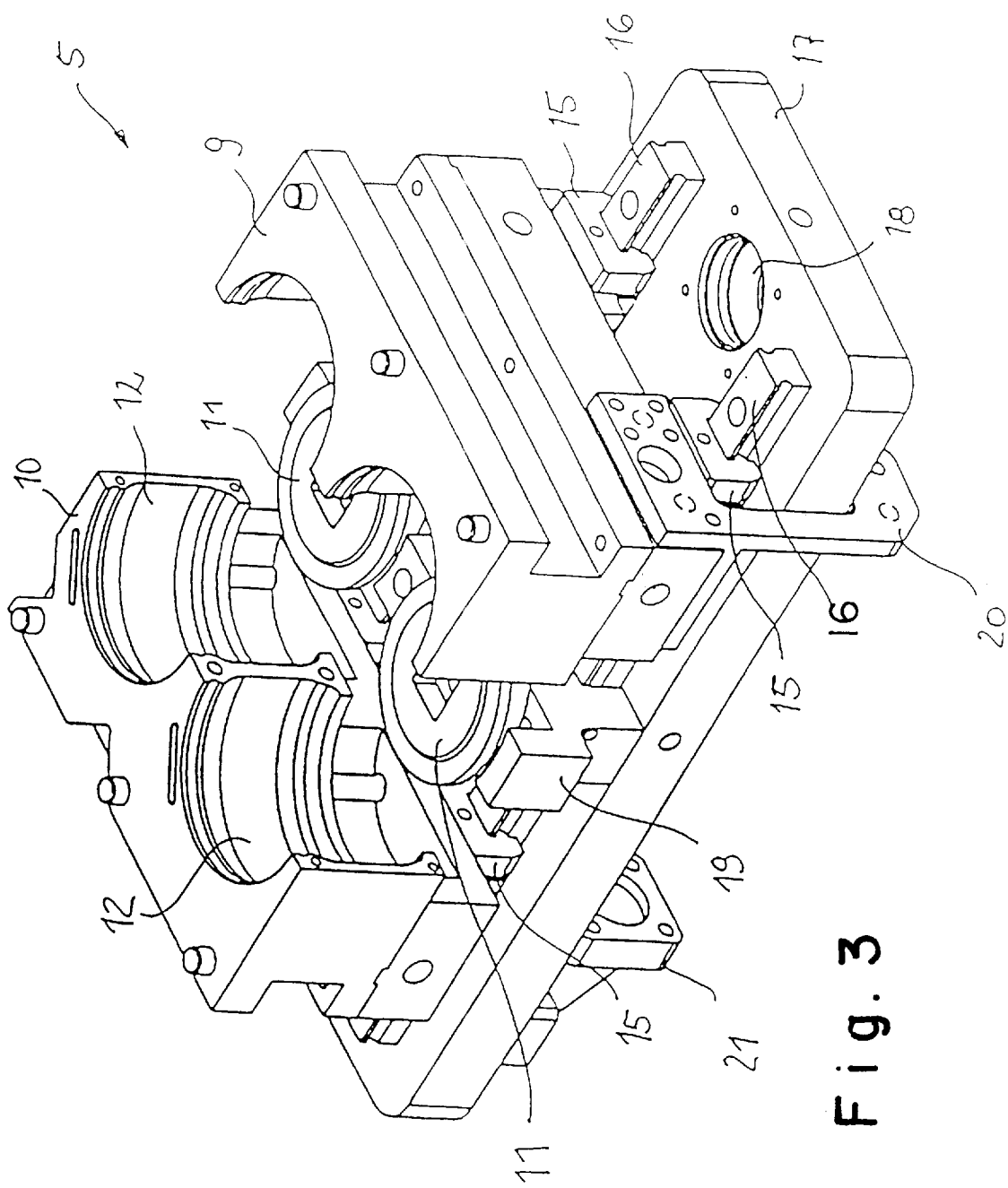
FIG. 3 is a perspective inclined view of a lower mold of the molding station according to a first embodiment.

FIG. 3 shows an embodiment of the lower mold 5 with two adjacent mold cavities 12 in the opened state. The mold halves 9, 10 of I he lower mold 5 are slidably supported via slides 15 on guide rails 16. The guide rails 16 are arranged on a support plate 17 which, in turn, is vertically movably supported via receiving holes 18 on a column type guide frame (not shown).

The counter-plugs 11 which define the bottom of the mold cavity 12 are also supported on the guide rails 16 via a support means 19.

Such a mold configuration advantageously permits an exchange of the individual parts of the lower mold 5 for creating mold cavities 12 of different configurations and easily allows for complicated geometries with undercuts for the packaging containers. The lower mold halves 9, 10 and also the counter-plug 11 may comprise filling channels for cooling liquids flowing therethrough, or also receive heating means, also for a locally differentiated heating of the mold.

The lateral closing and opening control of the oppositely movable lower mold halves 9, 10 may be performed in combination with a slide-fixed stop 20 and a control device (not shown here) which is provided in combination with a guide means 21.

FIGS. 4a to 4c are a front view (FIG. 4a), a top view (FIG. 4b) and a side view of the lower tool according to FIG. 3 in a schematic illustration, so that reference is here made to the explanations given with respect to FIG. 3.

Figure 5:
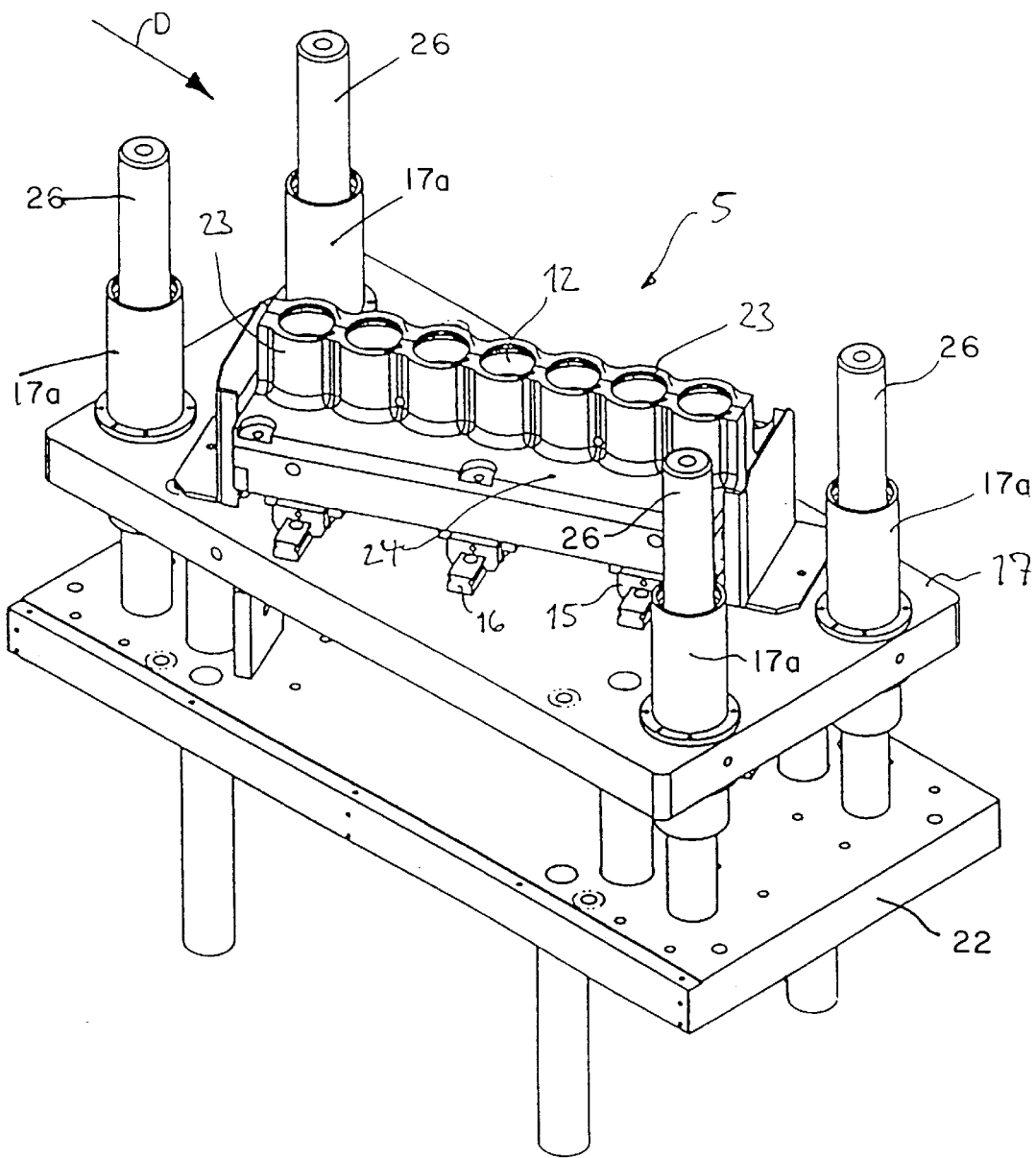
FIG. 5 is a perspective inclined view of a lower mold which is received in a column type guide frame of the molding station, according to a further embodiment.
Figure 6:
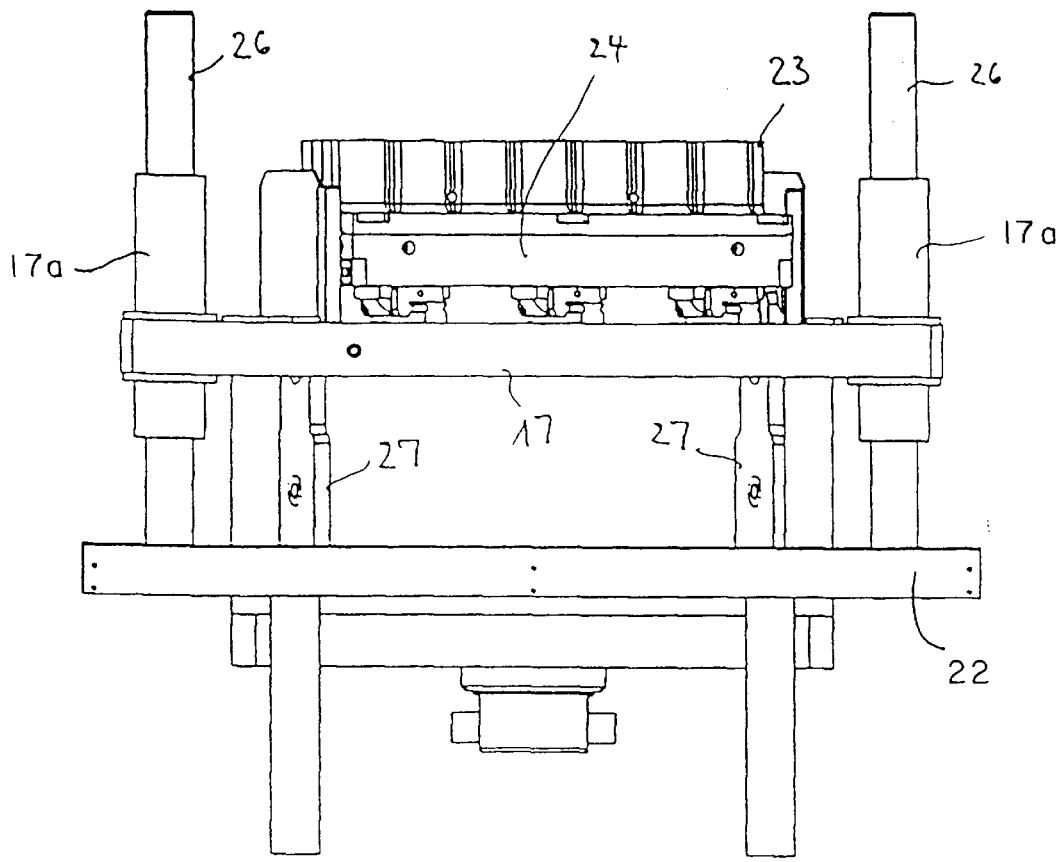
FIG. 6 is a front view according to FIG. 5.
Figure 7:
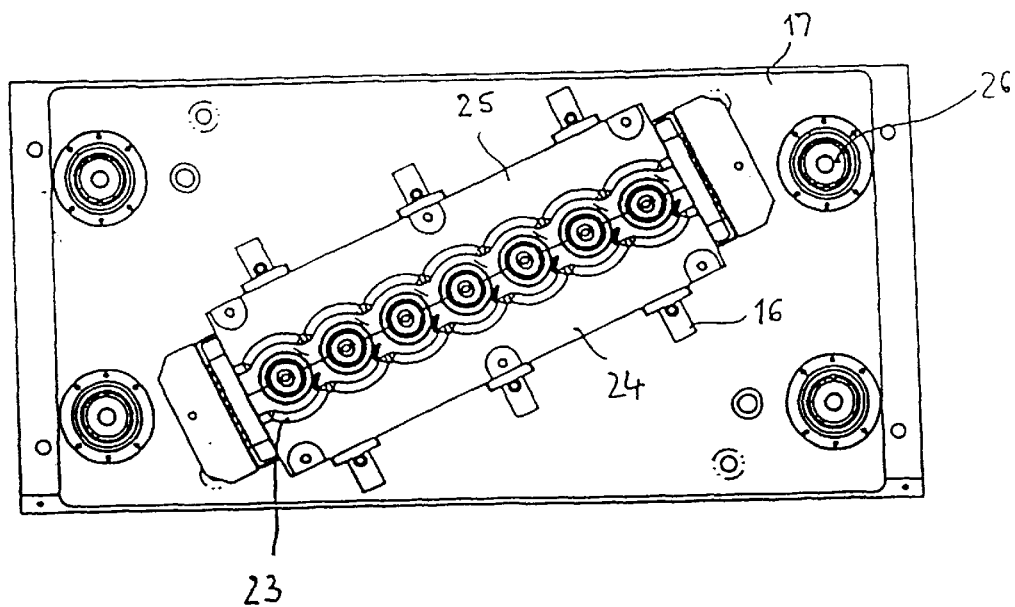
FIG. 7 is a top view according to FIG. 6.

Referring to the preferred embodiment of FIGS. 5–7, the lower mold 5 for the molding station II includes a frame having a stationary plate 22 parallel with the support plate 17. The stationary plate 22 supports a plurality of vertical columns 26 that extend through guide sleeves 17a, respectively, carried by the support plate 17.

In this embodiment, in a "series arrangement" of a plurality of mold cavities 12 together with boundary cylinder sections 23, which are each connected to, preferably integral with, opposite guide plates 24, 25 (FIG. 7), a lateral guide device is created for opening the lower mold 5, which takes place via lateral control cam means 27 along the guide rails 16 which are secured to the support plate 17 and on which the guide plates 24, 25 are supported via slides 15. A lateral movement of the two lower mold halves 9, 10 (formed by the cylinder sections 23 and the guide plates 24, 25) is thereby accomplished via a vertical movement of the support plate 17 along the guide columns 26 through mold engaging means of the control cam means 27. As for a possible cooling or heating of the lower mold for achieving an optimum manufacturing result, reference is made to the explanations given with respect to the embodiment shown in FIG. 3, which is also applicable to the present development in this respect.

What is particularly remarkable about said arrangement is the inclined (oblique) arrangement of the lower mold 5 in the column type guide frame 22, resulting in a particularly compact and space-saving arrangement and configuration of the molding station II and an efficient exploitation of the packaging film 1 which in FIG. 5 is moved in the direction of the arrow D; i.e., parallel to the longitudinal edges of the guide plate 17 relative to the lower mold 5.

The angle of inclination of the series arrangement relative to the running direction of the packaging film is preferably 45*. A plurality of such molds may optionally be provided in parallel in a "gapwise" arrangement.

A front view of the column type guide frame 22 with the lower mold 5 and a top view of said tool structure are illustrated in FIGS. 6 and 7.

Figure 8B:
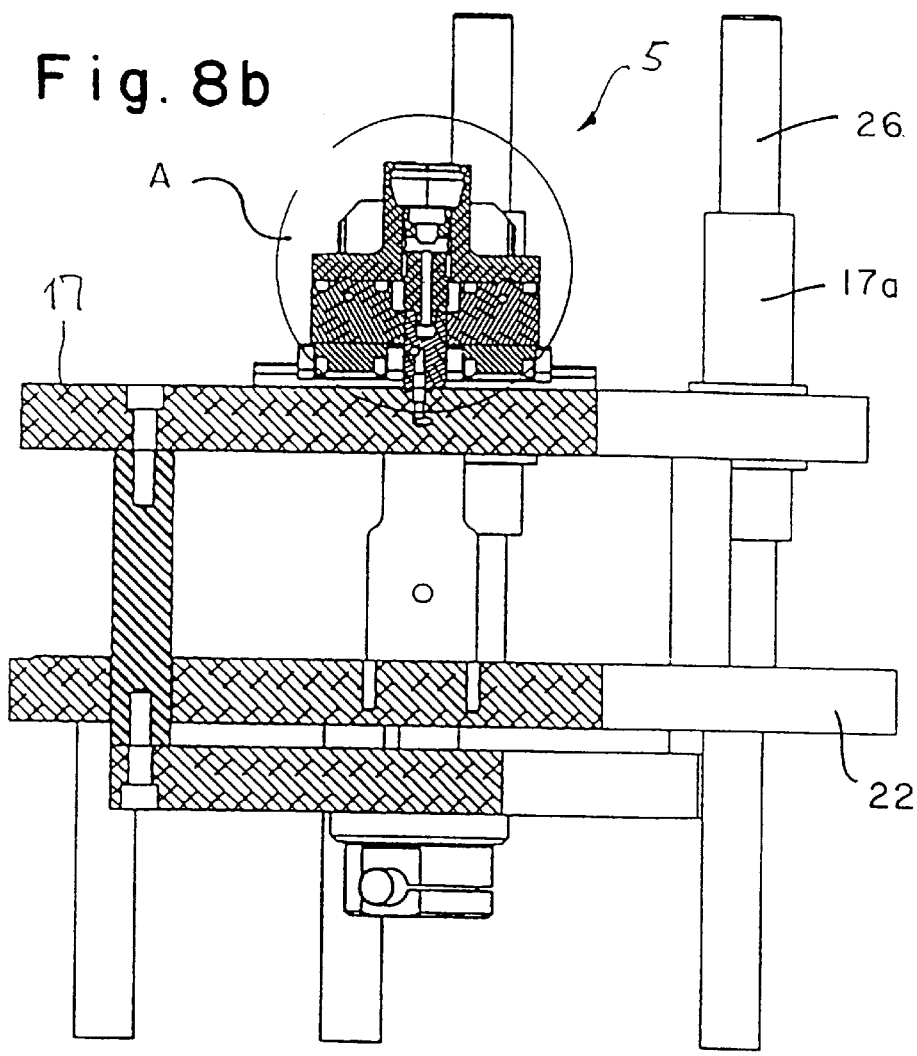
Figure 8A:
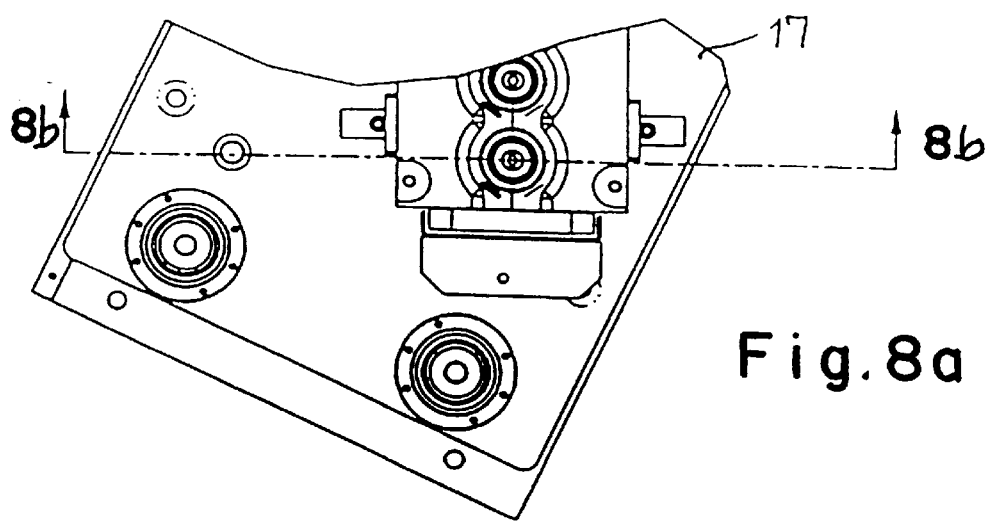
FIG. 8a is a partial view according to FIG. 7 with indication of a sectional extension, the lower mold being shown in a closed state.
Figure 9:
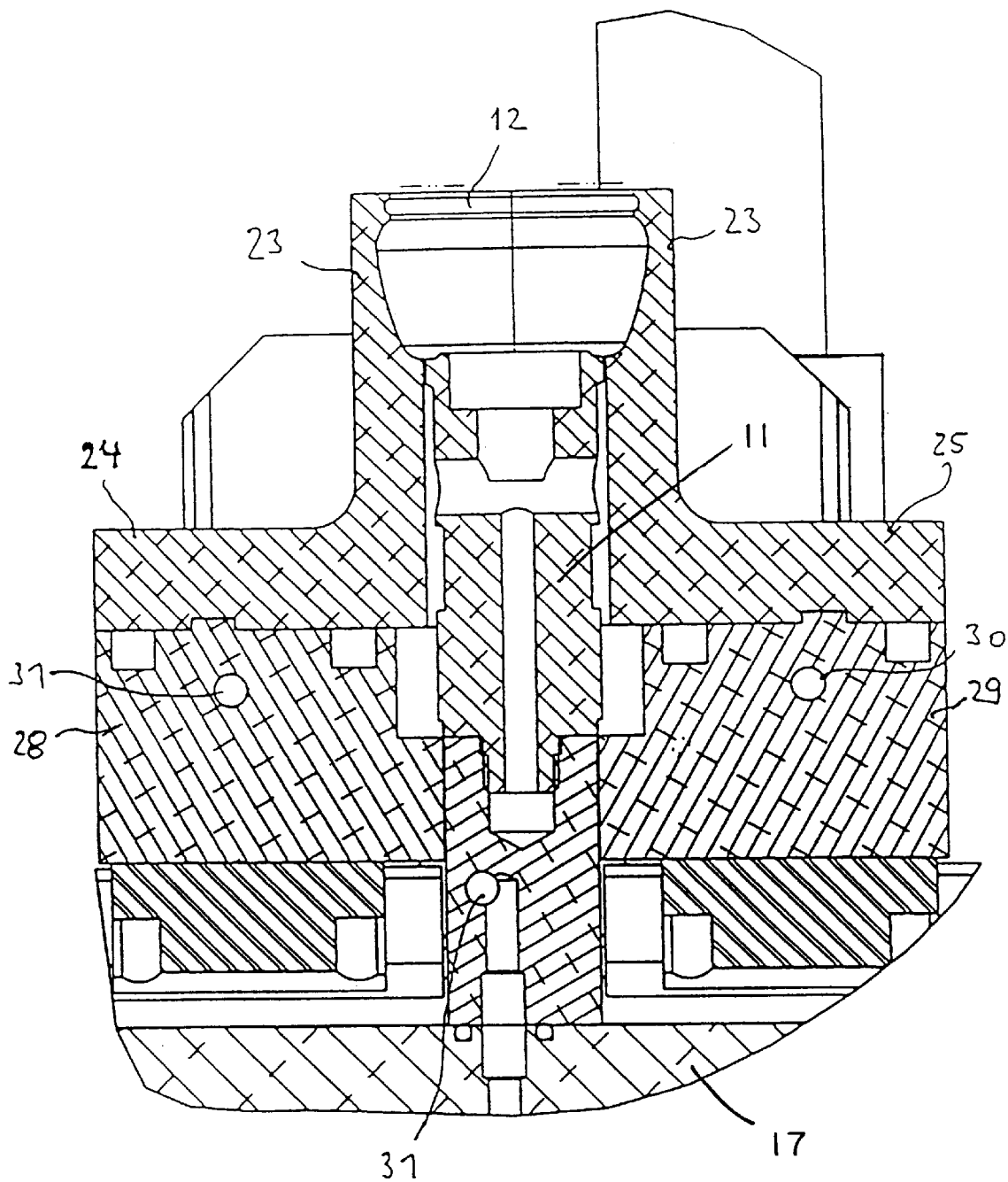
FIG. 9 is an enlarged view of detail A according to FIG. 8.

FIG. 8a is a partial view according to FIG. 7 for the closed lower mold, a sectional representation according to FIG. 8a being shown in 8b, with a detail A, which is shown on an enlarged scale in FIG. 9.

The detail according to FIG. 9 shows the lower mold in a closed state. The cylindrical sections 23 form the respective mold cavity 12, i.e. integrally with the guide plates 24, 25 and the counter-plug 11. A lateral movement for opening and closing the mold cavity 12 is jointly effected with support bodies 28, 29. Channels 30, 31 may serve to guide a coolant in the support bodies and also in the area of the counter-plug.

Figure 11:
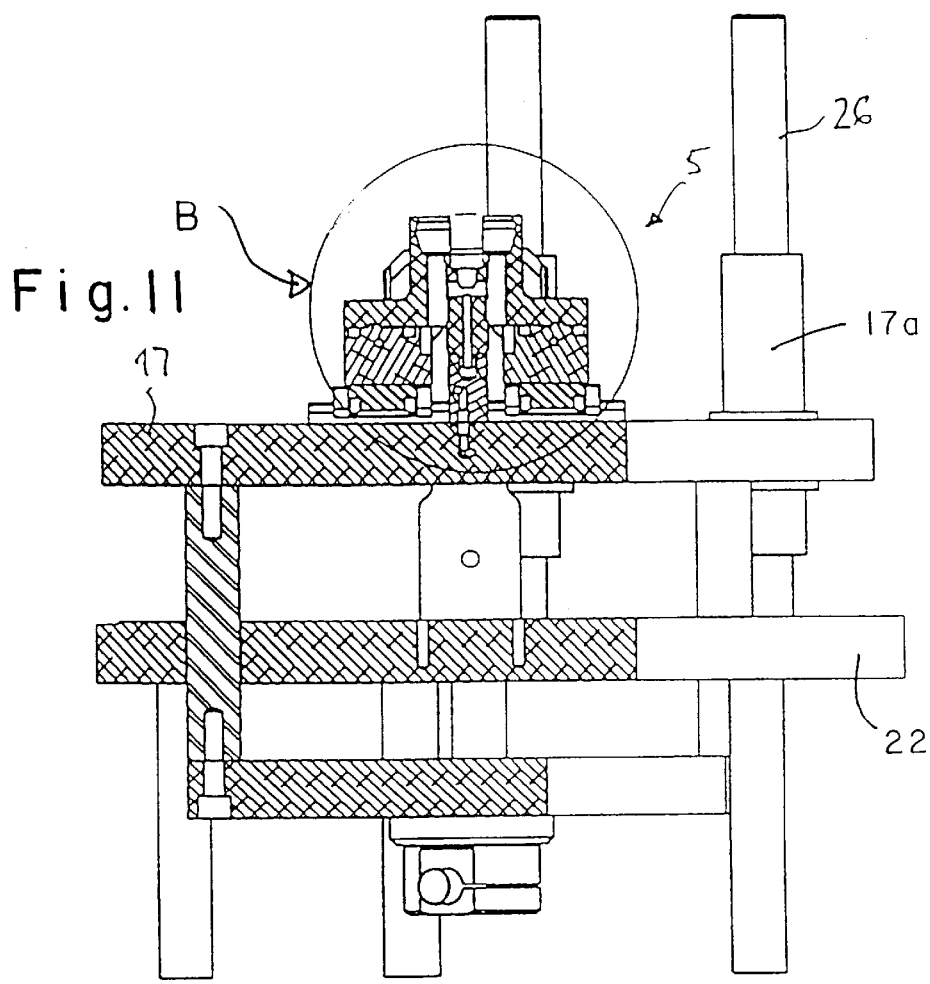
FIG. 11 is a sectional view according to FIG. 10.
Figure 10:
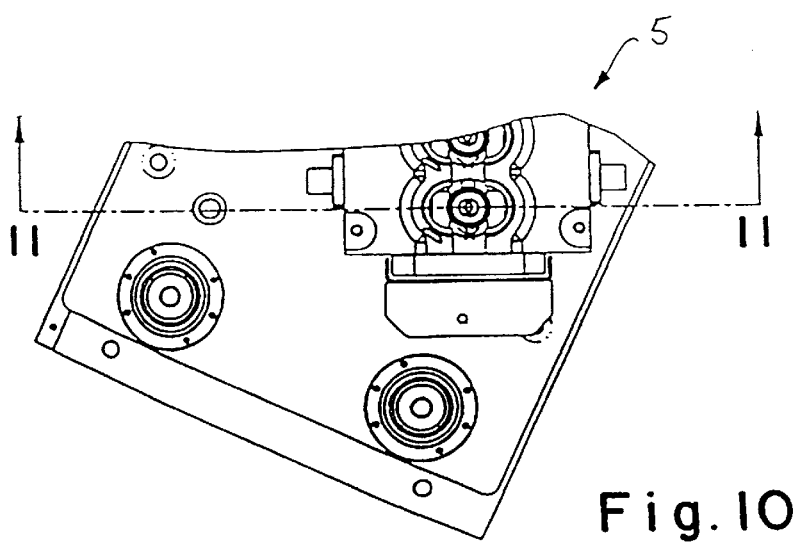
FIG. 10 is a partial view similar to that of FIG. 8, with indication of a sectional extension, the lower mold, however, being in its opened state.
Figure 12:
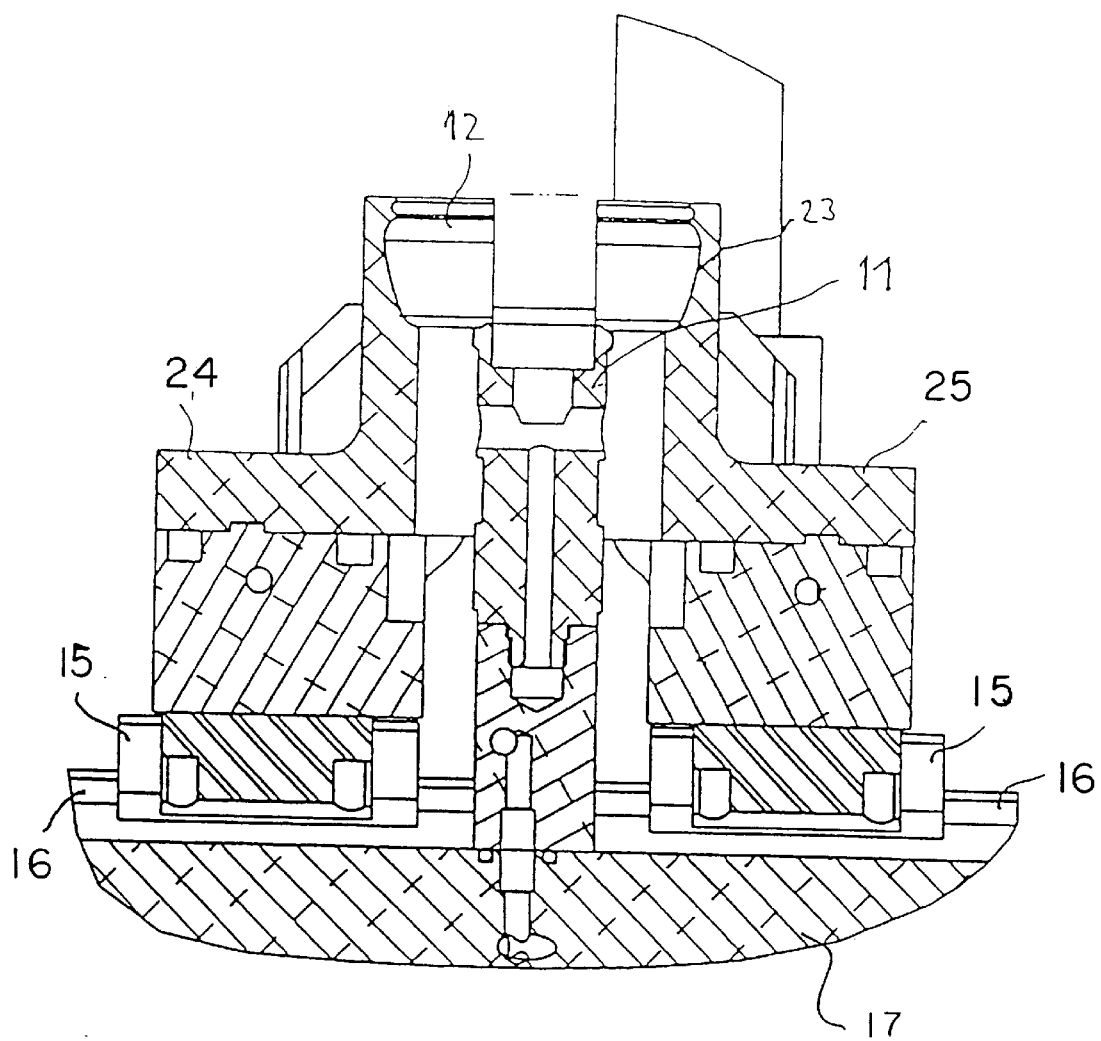
FIG. 12 is an enlarged view of detail B in FIG. 11.

FIGS. 10, 11 and 12 are illustrations corresponding to the illustrations of FIGS. 8a, 8b and 9, each for the opened lower mold.

Figure 14:
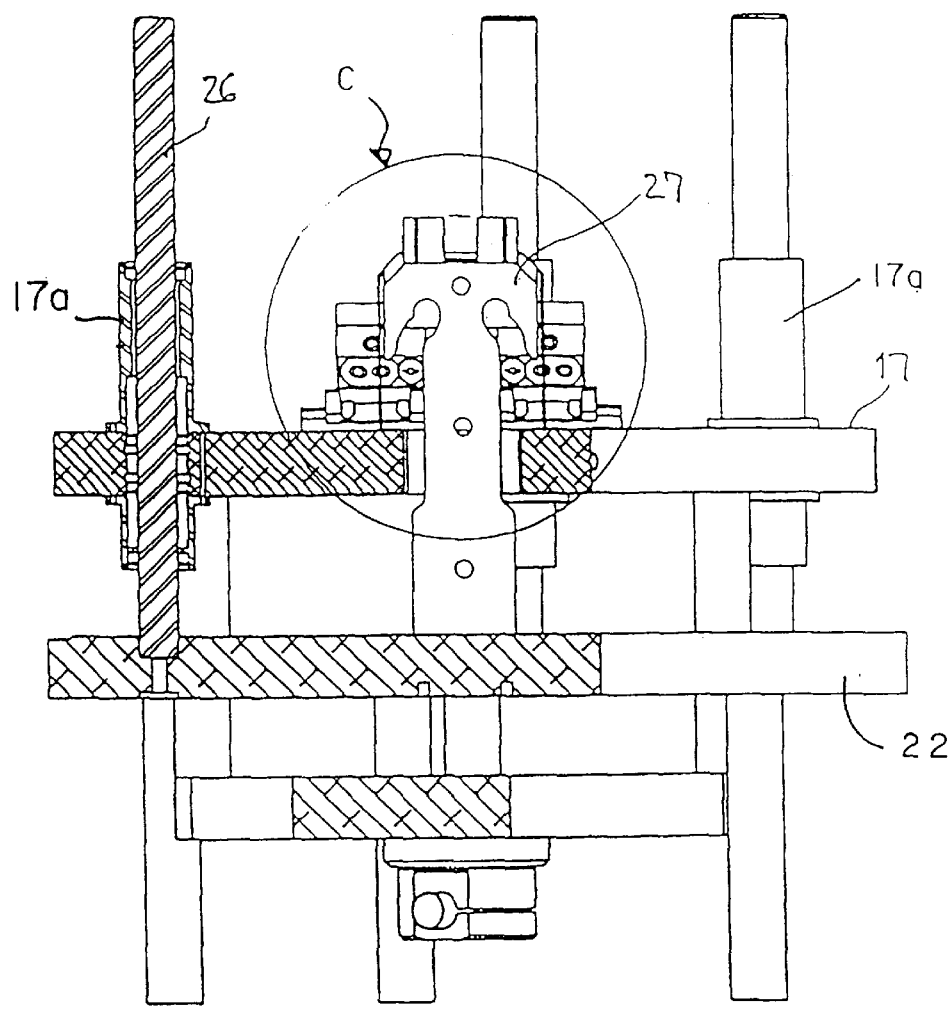
FIG. 14 is a sectional view according to FIG. 13.
Figure 13:
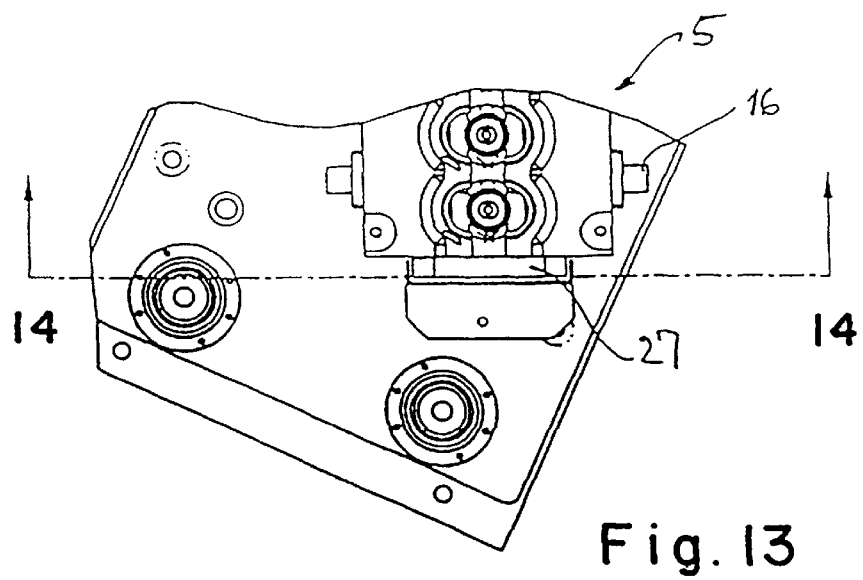
FIG. 13 is a partial view similar to that in FIGS. 8 and 10 for the lower mold in the opened state and with a changed sectional extension.

FIGS. 13 and 14 are sectional illustrations (side views) of the column type guide frame and the lower mold 5 in the opened state of the mold, which the control cam means 27 being shown more accurately at the same time. This means is configured as a rising molding member which passes through the opening 34 contained in support plate 17 and defines the mold block of the lower mold 5 at the front side. The control cam means 27 comprises a pair of inclined control cams 32 which are brought into engagement with corresponding counter-mold elements (rolls 33 which are formed on the support bodies 28, 29) upon a vertical relative movement between control cam means 27 and support bodies 28 and 29, respectively, and effect a lateral forced control for opening and closing the lower mold halves 8, 9 (and the corresponding guide plates 24, 25 with the cylinder sections 23).

Figure 15:
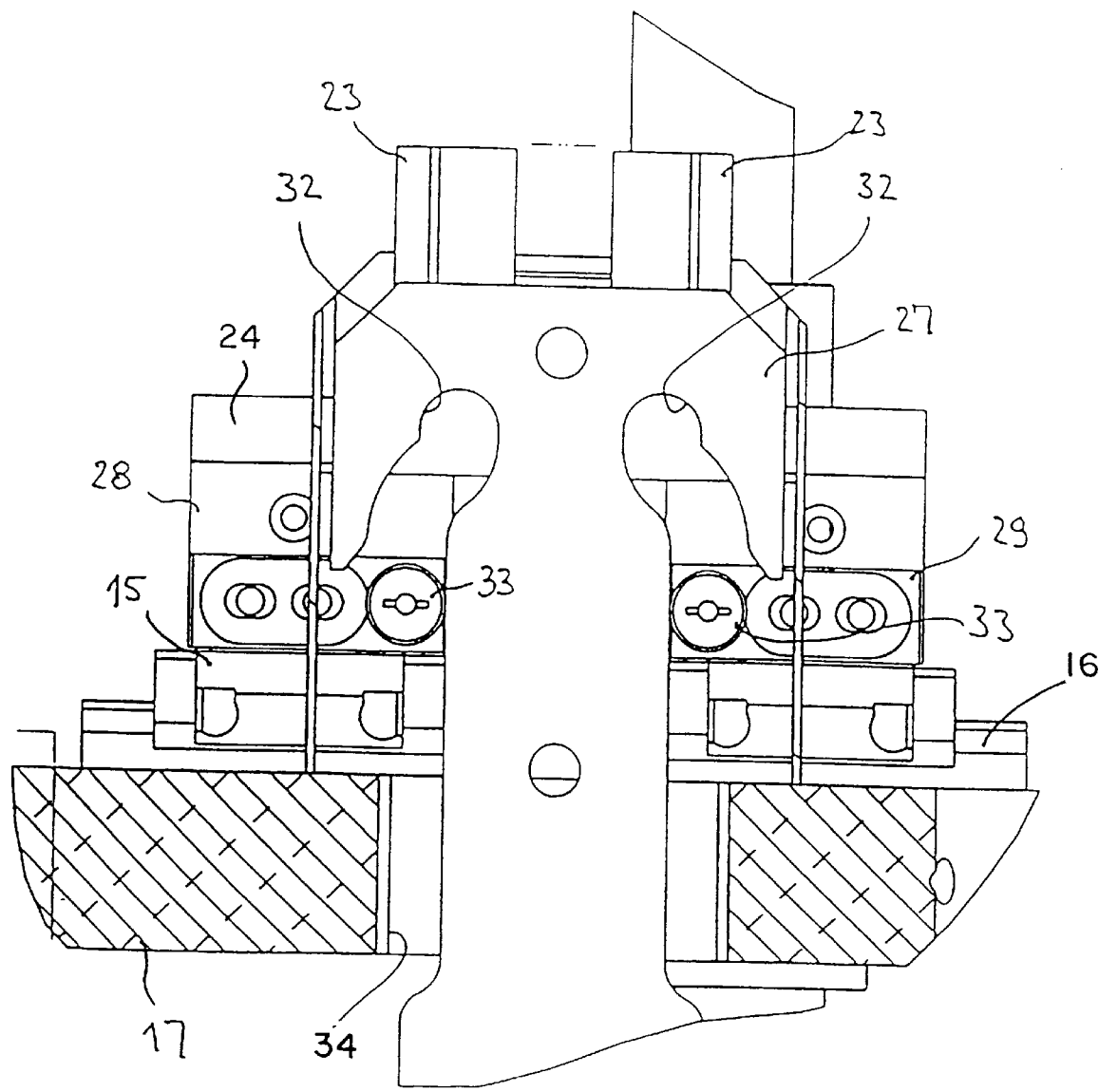
FIG. 15 is an enlarged view of detail C of FIG. 14 regarding the control cam means for the opening and closing movement of the lower mold.

A very advantageous and functionally reliable control for the opening and closing movement of the lower mold 5 is thereby realized (see also the enlarged illustration of FIG. 15 according to detail C of FIG. 14).

Figure 16A:
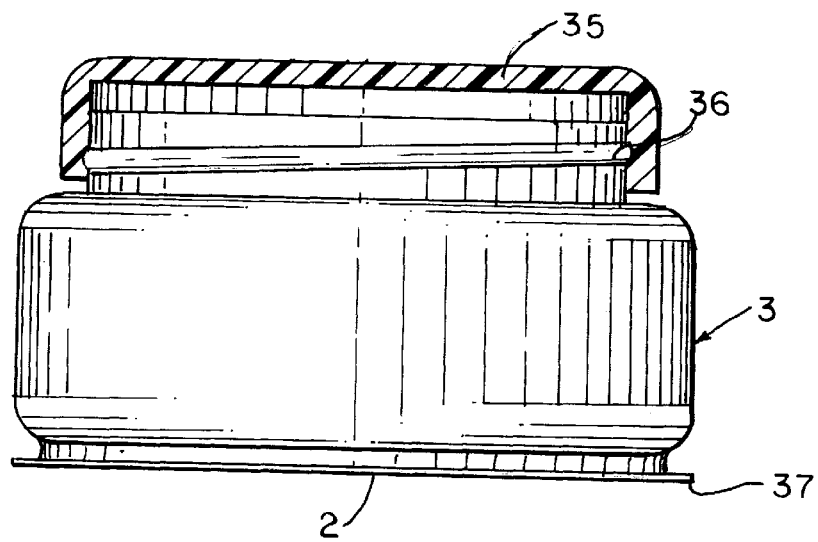
FIGS. 16a to 16c show embodiments of packaging containers.
Figure 16B:
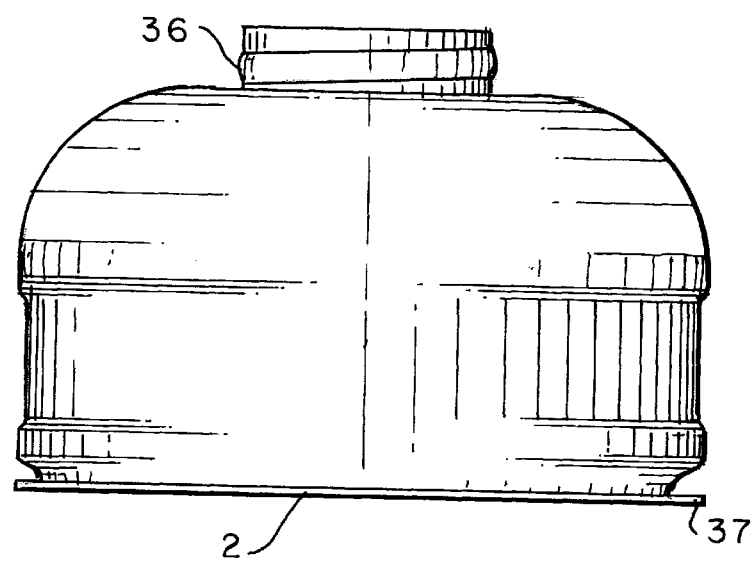
Figure 16C:
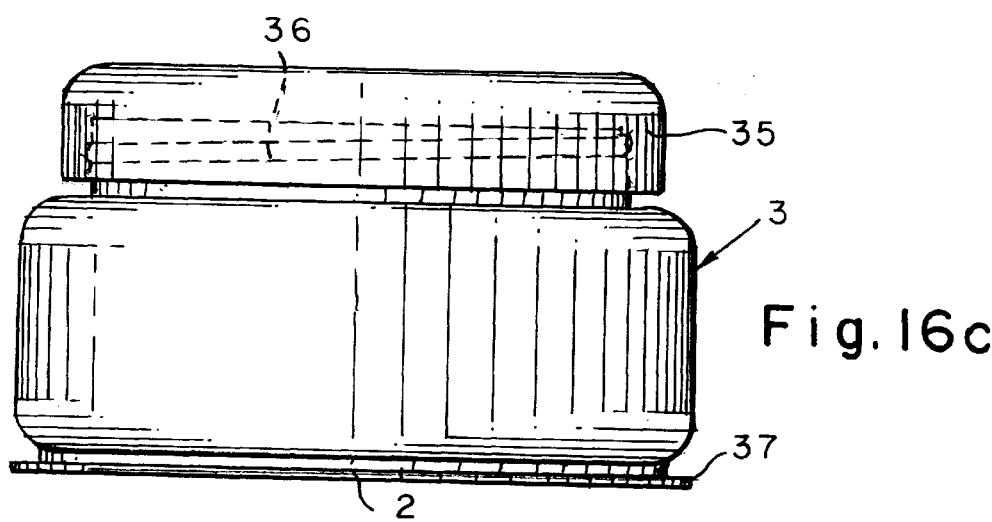

FIGS. 16a, 16b, 16c show embodiments of packaging containers 3 which are made of a thermoplastic material and produced according to the above-discussed method and with the above-explained devices.

It is possible with the method of the invention to provide a screw-cap cover in addition to the cover of the packaging container 3 by way of the heat-sealing film 2, i.e. either at the same side as the sealing film '91 or at the opposite side of the packaging container 3. In other words, it is possible with the apparatus of the invention to produce reclosable plastic packaging containers 3 in a particularly advantageous manner, which is of particularly great advantage to the storing of residual amounts (foodstuff) in the packaging containers and can drastically increase the useful life of the packaging container 3, resulting in a considerably lower environmental load.

FIGS. 16a to 16b show embodiments for packaging containers 3 provided with a screwable cover 35 which also consists of a plastic material. The special feature of these embodiments is that the cover is screwed onto the former "bottom side" (based on the manufacturing process) of the packaging container 3 which in this area is provided with a screw thread 36. This means that the "hot-sealing side" in the ready-for-use state forms the bottom of the filled packaging container while the screw thread 36 is circumferentially provided in the former bottom area (based on the shaping process) and the container bottom comprises an opening device, i.e. it is so preembossed, prepunched or otherwise weakened in its material thickness that a simple opening of that side of the packaging container is possible so that said side forms the opening and withdrawal side of the packaging container to be used by the consumer, while the sealing film 2 forms the bottom of the packaging container 3 which remains closed during practical use.

FIG. 16b shows another packaging container 3 without a cover.

In the case (which is not shown) where the screw cap is to be arranged at the same side as the sealing film and the screw cap is to be disposed to grip over the sealing edge and the sealing film (i.e. the screw thread is positioned below the sealing film on the outer circumference of the packaging container), the sealing edge is made as narrow as possible and a corresponding tear tab is designed such that said tab can be bent to present no obstacle to the screwing of the cover. Of course, the sealing edge itself may be used as a carrier for attaching a further cover (snap-type seat) (optionally in further circumferential contact with the remaining circumferential wall of the container).

What is claimed is:

1. Apparatus for producing containers from a strip of moldable synthetic plastic film (1) that is transported longitudinally in a given direction (D), comprising:
   (a) upper (4) and lower (5) mold means arranged above and below the strip, respectively, said lower mold means being sectional and including:
      (1) a pair of parallel cylinder lower mold sections (23) arranged at an acute angle relative to the transport direction of the film strip;
      (2) support means supporting said cylinder sections for lateral displacement between adjacent and separated positions relative to each other, respectively, said lower mold sections having adjacent side walls wherein the upper portions of said lower mold sections contain a plurality of recesses that cooperate to define a plurality of lower mold cavities (12) when said lower mold sections are in said adjacent position, said lower mold cavities being arranged in a row that is inclined at said acute angle relative to the transport direction of the film strip, each of said lower mold cavities including an undercut portion (14), said support means including:
         (a) a support plate (17);
         (b) parallel spaced guide rails mounted on said support plate, said guide rails being normal to and extending beneath said pair of lower mold sections; and
         (c) a plurality of guide members connecting each of said lower mold sections for sliding movement with said guide rails, respectively; and
      (3) control cam means (27) for displacing said lower mold sections between said adjacent and said separated positions, respectively.
   (b) said upper mold means including:
      (1) a plurality of displaceable upper plugs (8) opposite said lower mold cavities, respectively, said plugs being displaceable toward said lower mold means to deep-draw the film into the associated mold cavity, respectively; and
      (2) means (6) for supplying compressed air from said upper mold means into the mold cavities above the portion of the film deep-drawn therein, thereby to form containers (3) in said cavities.

2. The container producing apparatus defined in claim 1, and further including:
   (c) stationary guide frame means including:
      (1) a stationary plate (22) parallel with and arranged below and said support plate; and
      (2) a plurality of guide columns (26) extending from said stationary plate toward said upper mold means, said support plate including a plurality of guide sleeves (17a) slidably receiving said guide columns, respectively, thereby to guide said support plate for displacement relative to said guide frame means.

3. The container producing apparatus defined in claim 2, wherein said acute angle of inclination of said pair of lower mold sections and said row of mold cavities relative to the direction of strip transport is 45°.

4. The container producing apparatus defined in claim 2, wherein said control cam means comprises:
   (a) a plurality of operating cams (32) connected with said sationary guide frame means and extending adjacent said lower mold cavities, respectively; and
   (b) a plurality of cam followers (33) connected with said lower mold sections adjacent said operating cams, respectively, said control cam means being operable to displace said lower mold sections between said adjacent and separated positions when said support plate is in said upper and lower positions, respectively.

5. The container producing apparatus as defined in claim 4, wherein said operating cams (32) include cam supports having first ends connected with said stationary plate, said cam supports extending in the direction of said upper mold means through corresponding openings (34) contained in said support plate, respectively.

6. The container producing apparatus as defined in claim 1, and further including a plurality of bottom plugs (11) carried by said support plate for closing the bottoms of said cavities, respectively, when said mold sections are in said adjacent position.

7. The container producing apparatus as defined in claim 6, and further including means (30) for varying the temperature of said lower mold sections.

8. The container producing apparatus as defined in claim 7, and further including means (31) for varying the temperature of said bottom plugs.

9. The container producing apparatus as defined in claim 1, and further including:

(c) a container filling station (III) for successively filling the containers with a given material;

(d) a container sealing station (IV) for sealing the filled containers;

(e) a separating station (V) for separating the sealed filled containers from the film strip; and (f) a discharging station (VI) for discharging the separated, filled, and sealed containers.

10. The container producing apparatus defined in claim 9, and further including a preheating station (I) for preheating the synthetic, plastic packaging film strip.

11. The container producing apparatus defined in claim 10, wherein said sealing station includes means for supplying a sealing film (2) to said containers above said packaging film strip.

* * * * *